United States Patent [19]

Larsen

[11] Patent Number: 5,716,419
[45] Date of Patent: Feb. 10, 1998

[54] PROCESS FOR CRYSTALLIZATION OF MINERAL SALTS

[75] Inventor: David A. Larsen, Cheyenne, Wyo.

[73] Assignee: PPG Industries, Inc., Pittsburgh, Pa.

[21] Appl. No.: 688,913

[22] Filed: Jul. 31, 1996

[51] Int. Cl.$^6$ ............................. C01D 1/30; C01D 7/24; B01D 9/00

[52] U.S. Cl. ............... 23/300; 23/295 R; 23/302 R; 23/302 T; 23/304

[58] Field of Search ....................... 23/295 R, 298, 23/300, 302 R, 302 T, 304, 305 R

[56] References Cited

U.S. PATENT DOCUMENTS

| | | | |
|---|---|---|---|
| 3,836,628 | 9/1974 | Ilardi et al. | 423/206 |
| 4,023,935 | 5/1977 | Levinthal et al. | 23/302 A |
| 5,518,636 | 5/1996 | Petrille et al. | 210/749 |

OTHER PUBLICATIONS

F. M. Konikoff et al., "Phospholipid molecular species influence crystal habits and transition sequences of metastable intermediates during cholesterol crystallization from bile salt–rich model bile", Journal of Lipid Research, vol. 35, pp. 60–70, 1994.

D. E. Garrett, *Natural Soda Ash: Occurrences, Processing and Use*, pp. 282–285; 303–304; and 402–404, 1992.

J. W. Mullin, *Crystallization*, pp. 207–213; and 258–299, 1972.

A. Wendel, "Lecithin", *Kirk–Othmer Encyclopedia of Chemical Technology*, Fourth Edition, vol. 15, pp. 192–210, 1995.

D. Butts, "Chemicals from Brine", *Kirk–Othmer Encyclopedia of Chemical Technology*, Fourth Edition, vol. 5, pp. 817–837, 1993.

F. A. Green, "Binding of 14–C Phosphatidylcholine to Sodium Chloride Crystals", Lipids, vol. 5, No. 2, pp. 276–277, 1970.

H. Liu et al., "Effects of Crystallization Conditions on Sedimentation in Canola Oil", JAOCS, vol. 71, No. 4, pp. 409–415, Apr. 1994.

S. Tazuma et al., "Degree of fatty acyl chain unsaturation in a biliary lecithin dictates cholesterol nucleation and crystal growth", Biochimica et Biophysica Acta 1215, pp. 74–78, 1994.

*Primary Examiner*—Gary P. Straub
*Attorney, Agent, or Firm*—Frank P. Mallak; Irwin M. Stein

[57] ABSTRACT

Mineral salts, e.g., potassium chloride, are crystallized from aqueous solutions thereof in the presence of a crystal growth promoting amount of lecithin or lecithin containing compositions. Mineral salts include alkali metal and alkaline-earth metal chloride, sulfate, carbonate, phosphate and nitrate salts. The process is described as providing increased amounts of large crystals and a narrower and more uniform crystal size distribution.

19 Claims, No Drawings

PROCESS FOR CRYSTALLIZATION OF MINERAL SALTS

DESCRIPTION OF THE INVENTION

The present invention relates to the use of a novel crystal growth promoting agent in crystallization processes used to recover mineral salts from aqueous solutions containing those mineral salts. The term "mineral salts", as used herein, is defined as salts of inorganic acids and carbonic acid. More particularly, this invention relates to the use of lecithin and compositions containing lecithin in crystallization processes used to separate and purify alkali metal and alkaline-earth metal chloride, sulfate, carbonate, phosphate and nitrate salts.

Commercial processes for producing the above-described mineral salts commonly employ a crystallization stage that includes steps for the formation, growth and separation of the salt crystals in order to meet the requirements of yield, purity and size distribution for the product. For example, the hot leaching process for the recovery of a mineral salt such as potassium chloride from a mined ore containing potassium chloride and other salts includes a crystallization step. Moreover, in order to produce analytical or pharmaceutical grade potassium chloride, single or multiple recrystallizations of potassium chloride crystals produced by the hot leaching process is required. As used herein, the term "crystallization processes" includes recrystallization steps that are often used to improve the purity, i.e., reduce the level of impurities, of mineral salt crystals.

The use of additives or crystal habit modifiers in crystallization processes is known to promote the formation of crystals of a uniform size and composition. Organic materials reported to be crystal habit and growth modifiers by J. W. Mullin in *Crystallization*, Butterworth & Co., 1972, pp 208–209, include anionic surfactants, e.g., alkyl sulfates, alkane sulfonates and aryl alkyl sulfonates; cationic agents such as quarternary ammonium salts; non-ionic surfactants; and some polyelectrolytes, e.g., polyacrylamides and sodium carboxymethyl cellulose. U.S. Pat. No. 3,836,628 discloses the use of a surfactant in mineral oil as a crystal growth modifier during the crystallization of sodium carbonate monohydrate from an aqueous solution.

Lecithin is widely used in the manufacture of chocolate confections to reduce 'bloom' on the surfaces of the confection as a result of its dispersive effect on the chocolate fat crystals. See page 211 of the aforesaid publication *Crystallization*. Lecithin is also known as a natural crystal inhibitor in oils such as cotton seed, canola and sunflower seed in which the action of lecithin is mainly to retard the growth of crystals. The use of soya lecithin in combination with a dispersing agent, such as TWEEN® 80, a polyoxyethylene sorbitan monooleate, in water to neutralize quarternary bactericides is described in U.S. Pat. No. 5,518,636.

In the formation of cholesterol gallstones, biliary lecithin species have been reported to strongly influence the early cholesterol crystallization events. In model biles, lecithins having saturated short-chain, medium-chain and polyunsaturated long-chain fatty acids induce rapid precipitation of cholesterol whereas, lecithins having saturated long-chain fatty acids and natural sphingolmyelins retarded cholesterol crystallization. See "Phospholipid Molecular Species Influence Crystal Habits and Transition Sequences of Metastable Intermediates During Cholesterol Crystallization from Bile Salt-Rich Model Bile", F. M. Konikoff et al, Journal of Lipid Research, Vol 35, 1994, pp 60–70.

The present invention relates to the unexpected discovery that lecithin can be used to promote the formation of more large crystals and a narrower and more uniform crystal size distribution in crystallization processes for the recovery of mineral salts. Larger crystals are economically preferred since the costs for growing and processing crystals decreases as the crystal size increases. Other benefits of producing more large crystals include improved dewatering during processing, which results in a finished product of improved purity and higher bulk density. For most industrial purposes, the demand is for a narrower and more uniform crystal size distribution, which results in the crystalline product having good storage and transportation properties.

DETAILED DESCRIPTION

In accordance with the present invention, a mineral salt is crystallized from an aqueous solution containing such salt in the presence of a crystal growth promoting amount of lecithin. Lecithin is a mixture of glycerophospholipids containing a variety of substances, such as sphingosylphospholipids, triglycerides, fatty acids and glycolipids that have been obtained from natural sources, e.g., animal, vegetable or microbial sources. Also commercially available are synthetic lecithins, e.g., dioleoyl lecithin, dipalmitoyl lecithin, and modified lecithins, i.e., lecithins from natural sources that have been chemically modified, e.g., hydroxylated or acetylated, or enzymatically modified, e.g., lecithin treated with phospholipase $A_2$ to remove the acyl group from the 2-position to form lysolecithin. All of the aforementioned types of lecithin may be used in the process of the present invention.

The glycerophospholipids are glycerin esters having two fatty acid groups and one phosphoric acid group which has been reacted with a component selected from the group consisting of choline, ethanolamine, inositol, serine, glycerol and hydrogen. Accordingly, these lecithin materials are also referred to as 1,2-diacyl-sn-glycero(3)phosphocholine, 1,2-diacyl-sn-glycero(3)phosphoethanolamine, 1,2-diacyl-1,2-diacyl-sn-glycero(3)phosphoinositol, 1,2-diacyl-sn-glycero(3) sn-glycero(3)phosphoinositol, 1,2-diacyl-sn-glycero(3)phospho-L-serine, 1,2-diacyl-sn-glycero(3)phospho(3)-sn-glycerol and phosphatidic acid, respectively.

The main sources of lecithin include vegetable oils, e.g., soybean, cottonseed, corn, sunflower and rapeseed oil, and animal tissues such as egg and bovine brain. Recovery of lecithin is by extraction of the vegetable oil or tissue with organic solvent, alkali or water washings. Commercially, the majority of lecithin produced is derived from soybeans (soya lecithin). There are more than 40 different formulations containing lecithin available commercially. These can vary from crude oily extracts from natural sources to purified and synthetic phospholipids. A review of the manufacturing and processing of lecithin is found in the *Kirk-Othmer Encyclopedia of Chemical Technology*, Fourth Edition, 1993, Volume 15, pp 197–201, which is incorporated herein by reference. All of the aforementioned types of lecithin may be used in the process of the present invention.

There are 6 common commercial grades of lecithin available. These are generally liquids except for deoiled lecithin which is a dry powder. They include (1) clarified lecithins which are produced by filtration of either the miscella, i.e., the extracted solution obtained by extraction of lecithin from a vegetable, e.g., soybeans, with organic solvent that contains solvent, crude oil, fines and moisture, or the recovered crude oil; (2) fluidized lecithins wherein the fluidization is done by adding calcium chloride, fatty acids, vegetable oil, or special diluents; (3) compounded lecithins, which are made by addition of emulsifiers like sorbitan esters, polysorbates, or other surfactants; (4) hydroxylated lecithins, which are highly water dispersible and made by the reaction of hydrogen peroxide and lecithin in the presence of a lactic or acetic acid; (5) deoiled lecithins for which the resulting dried product is available in different particle sizes with free flowing properties; and (6) fractionated lecithins, which are made from crude or deoiled lecithins by extraction with alcohol, resulting in alcohol-soluble and alcohol-insoluble fractions with different functionality. All of the aforementioned types of lecithin may be used in the process of the present invention.

The lecithin used in the present invention is preferably derived from a source selected from the group consisting of soybean oil, cottonseed oil, corn oil, sunflower oil, rapeseed oil, eggs and bovine brains. More preferably, the lecithin is derived from soybean oil, corn oil and eggs; most preferably, from soybean oil. The preferred physical form of lecithin and formulations containing lecithin used in the present invention is liquid.

Unless indicated otherwise, all numbers expressing weight ratios and quantities of ingredients used herein in the description and claims, are to be understood as modified in all instances by the term "about".

Lecithin used in the process of the present invention is preferably in a form that is most suitable for the aqueous mineral salt solution in which the lecithin is to be incorporated. While lecithin is generally insoluble in water, it is dispersible in water. The dispersibility of lecithin in aqueous salt solutions decreases when the pH of such solutions is below 8.5. In order to aid the dispersion of lecithin in aqueous mineral salt solutions having a pH less than 8.5, a surfactant or surfactant system having an HLB or an average HLB, i.e., a hydrophobe/lipophobe balance, of 9 to 10 may be used in combination or in conjunction with the lecithin. Suitable surfactants that may be used for this purpose include nonionic surfactants such as triglycerol monooleate, nonylphenol ethoxylates, polysorbate 80, i.e., polyoxyethylene (20) sorbitan monooleate, block copolymers of propylene oxide and ethylene oxide, ethoxylated alcohols and mixtures thereof. Preferably, the nonionic surfactant is selected from the group consisting of triglycerol monooleate, polysorbate 80, and mixtures thereof. The amount of surfactant used is an amount sufficient to disperse the lecithin in the aqueous mineral salt solution, i.e., a dispersing amount. The weight ratio of surfactant:lecithin can range from 1:1 to 1:11 and preferably ranges from 1:2 to 1:10. The dispersability of lecithin may also be improved by chemical modification, e.g., hydroxylation, of the lecithin. Commercially available hydroxylated lecithins are available under the Centrolene® label from Central Soya Company, Inc.

The amount of lecithin present in the aqueous solution containing the mineral salt during crystallization is a crystal growth promoting amount, i.e., an amount of lecithin that promotes the formation of increased amounts of large mineral salt crystals and a more uniform and narrower crystal size distribution. Stated another way, the use of a crystal growth promoting amount of lecithin in a mineral salt solution during crystallization results in a reduction of the number of fines or small crystals, an increase of the number of large crystals and a narrower and more uniform size distribution of crystals when compared to an untreated mineral salt solution processed in an identical manner. The crystal growth promoting amount of lecithin can be added to the crystallization vessel or with the aqueous mineral salt solution charged to the crystallization vessel. Typically, lecithin is used in amounts of at least 5 parts by weight of lecithin per million parts (ppm) of the aqueous mineral salt solution to which lecithin is added. Preferably, the lecithin is used in amounts of from 5 to 1000 ppm, and more preferably, is used in amounts of from 10 to 500 ppm.

In accordance with the present invention, the aqueous mineral salt solution to which lecithin is added as a crystal growth promoting agent include solutions containing the metal ions selected from the group consisting of sodium, magnesium, potassium and calcium and anions selected from the group consisting of chloride, sulfate, carbonate, phosphate and nitrate. Examples of such mineral salts include sodium chloride, sodium sulfate, sodium carbonate, sodium phosphate, sodium nitrate, magnesium chloride, magnesium sulfate, magnesium carbonate, magnesium phosphate, magnesium nitrate, calcium chloride, calcium sulfate, calcium carbonate, calcium phosphate, calcium nitrate, potassium chloride, potassium sulfate, potassium carbonate, potassium phosphate and potassium nitrate. Preferably, the mineral salts are selected from the group consisting of sodium chloride, sodium sulfate, sodium carbonate, sodium nitrate, magnesium chloride, magnesium sulfate, calcium chloride, calcium sulfate, calcium carbonate, calcium nitrate, potassium chloride, potassium sulfate, potassium carbonate, potassium phosphate and potassium nitrate. More preferably, the mineral salts are selected from the group consisting of sodium chloride, sodium sulfate, sodium carbonate, magnesium sulfate, calcium chloride, calcium sulfate, potassium chloride, potassium sulfate, potassium carbonate and potassium nitrate. In the case of mineral salt solutions obtained from naturally occurring sources, mixtures of salts may be present in the solution. For example, naturally occurring potassium chloride ore usually contains also sodium chloride.

Many of these mineral salts are known as evaporites that are found in brine, i.e., an aqueous solution of sodium chloride and other water-soluble salts. The seas and oceans of the world are the largest sources of brine. Brine is also found in terminal lakes such as the Dead Sea in Israel and the Great Salt Lake in Utah and in ancient underground terminal lakes that have brine entrained in their salt beds. Brine may also be formed by dissolving mineral salt containing ore that has been recovered by conventional mining methods, e.g., room and pillar system, block caving, open pit and strip mining, or by solution mining of underground ore bodies. Solution mining is the recovery of any soluble salt in an underground deposit by dissolving it in situ and bringing the resultant solution to the surface. Further discussion of chemicals that are obtained from brine is found in the *Kirk-Othmer Encyclopedia of Chemical Technology*, Fourth Edition, 1993, Volume 5, pp 817–837, which discussion is incorporated herein by reference.

Many mineral salts are recovered from an aqueous solution of the salt by crystallization. Crystallization functions to separate, purify, concentrate and solidify the salt. The methods available for crystallization are many and varied. Crystals can be grown from aqueous salt solutions after a state of supersaturation of the salt in the solution is achieved. The way in which supersaturation is produced depends on the characteristics of the crystallizing system. Some solutes are readily crystallized from their solutions merely by cooling, while others have to be evaporated to a more concentrated form. Industrial crystallization processes include cooling and evaporation, vacuum cooling, controlled seeding, salting out crystallization, reaction crystallization, emulsion crystallization, extractive crystallization, adductive crystallization, desalination by freezing, countercurrent fractional crystallization and melt crystallization. Further discussion of industrial crystallization processes is found in

*Crystallization*, supra, pp 258–299, which discussion is incorporated herein by reference.

In accordance with the present process for crystallizing a mineral salt from an aqueous solution containing such mineral salt, a crystal growth promoting amount of lecithin is added to the aqueous solution prior to the inception of the crystallization process. In one embodiment, a crystal growth promoting amount of lecithin is used during the processing of seawater in sequential processing ponds to crystallize the salts contained therein. The first pond is used to concentrate the salts in the seawater. In accordance with this embodiment, impurities such as calcium sulfate and calcium carbonate are crystallized in the presence of lecithin. After the solution becomes saturated with sodium chloride, it is transferred to a second pond where sodium chloride is crystallized in the presence of a crystal growth promoting amount of lecithin.

In another embodiment, potash is crystallized in the presence of a crystal growth promoting amount of lecithin. Potash brine may be produced by the hot leaching process. In that process mined potash ore is crushed and leached with hot water. The resulting leachate or mother liquor is clarified and concentrated in evaporators. The concentrated mother liquor is charged to a crystallizer vessel and the potash crystallized in the presence of a crystal growth promoting amount of lecithin. The resulting crystals are separated from the mother liquor by centrifugation and dried.

In still another embodiment, a crystal growth promoting amount of lecithin is added to a saturated solution of potassium nitrate which is at a temperature of 33° C. The solution of potassium nitrate and lecithin is transferred to a cooling crystallizer maintained at 20° C. The residence time of the solution in the crystallizer is usually at least 30 minutes. Afterwards, the crystals are recovered by centrifugation of the cooled solution and are dried.

The present invention has been described with reference to specific details of certain embodiments thereof, however, it is not intended that such details should be regarded as limitations upon the scope of the invention, except insofar as they are included in the accompanying claims.

I claim:

1. In the process for crystallizing a mineral salt from an aqueous solution containing said mineral salt, said salt being a salt of a metal ion selected from the group consisting of sodium, magnesium, potassium and calcium, and an anion selected from the group consisting of chloride, sulfate, carbonate, phosphate and nitrate, the improvement comprising crystallizing said mineral salt in the presence of at least 5 parts of lecithin per million parts of aqueous solution, said resultant crystals being larger than those crystallized in the absence of lecithin.

2. The process of claim 1 wherein the mineral salt is selected from the group consisting of sodium chloride, sodium sulfate, sodium carbonate, sodium phosphate, sodium nitrate, magnesium chloride, magnesium sulfate, magnesium carbonate, magnesium phosphate, magnesium nitrate, calcium chloride, calcium sulfate, calcium carbonate, calcium phosphate, calcium nitrate, potassium chloride, potassium sulfate, potassium carbonate, potassium phosphate and potassium nitrate.

3. The process of claim 2 wherein the amount of lecithin used is from 5 to 1000 parts per million parts of the aqueous salt solution.

4. The process of claim 3 wherein said lecithin is derived from soybean oil.

5. The process of claim 3 wherein the lecithin used is a composition comprising lecithin and nonionic surfactant, and the weight ratio of surfactant:lecithin in said composition is from 1:1 to 1:11.

6. The process of claim 5 wherein said nonionic surfactant is selected from the group consisting of triglycerol monooleate, nonylphenol ethoxylates, polyoxyethylene (20) sorbitan monooleate, block copolymers of propylene oxide and ethylene oxide, ethoxylated alcohols and mixtures thereof.

7. In the process of crystallizing a mineral salt selected from the group consisting of sodium chloride, sodium sulfate, sodium carbonate, sodium phosphate, sodium nitrate, magnesium chloride, magnesium sulfate, magnesium carbonate, magnesium phosphate, magnesium nitrate, calcium chloride, calcium sulfate, calcium carbonate, calcium phosphate, calcium nitrate, potassium chloride, potassium sulfate, potassium carbonate, potassium phosphate and potassium nitrate from an aqueous solution containing said mineral salt, the improvement comprising crystallizing said mineral salt in the presence of from 5 to 1000 parts of lecithin per million parts of aqueous solution.

8. The process of claim 7 wherein the mineral salt is selected from the group consisting of sodium chloride, sodium sulfate, sodium carbonate, magnesium sulfate, calcium chloride, calcium sulfate, potassium chloride, potassium sulfate, potassium carbonate and potassium nitrate.

9. The process of claim 8 wherein the amount of lecithin used is from 10 to 500 parts per million parts of aqueous solution.

10. The process of claim 9 wherein the mineral salt is selected from potassium chloride, sodium chloride and mixtures of said salts.

11. The process of claim 8 wherein said lecithin is derived from a source selected from the group consisting of soybean oil, corn oil and eggs.

12. The process of claim 8 wherein said lecithin is derived from soybean oil.

13. The process of claim 12 wherein the lecithin used is a composition comprising lecithin and nonionic surfactant, the weight ratio of surfactant:lecithin in said composition is from 1:2 to 1:10, and said nonionic surfactant is selected from the group consisting of triglycerol monooleate, nonylphenol ethoxylates, polyoxyethylene (20) sorbitan monooleate, block copolymers of propylene oxide and ethylene oxide, ethoxylated alcohols and mixtures thereof.

14. The process of claim 7 wherein said lecithin is derived from a source selected from the group consisting of soybean oil, cottonseed oil, corn oil, sunflower oil, rapeseed oil, eggs and bovine brains.

15. The process of claim 7 wherein said lecithin is hydroxylated.

16. The process or claim 8 wherein the lecithin is a composition consisting lecithin and nonionic surfactant, and the weight ratio of surfactant:lecithin in said composition is from 1:1 to 1:11.

17. The process of claim 16 wherein said weight ratio of surfactant:lecithin is from 1:2 to 1:10.

18. The process of claim 16 wherein said nonionic surfactant is selected from the group consisting of triglycerol monooleate, nonylphenol ethoxylates, polyoxyethylene (20) sorbitan monooleate, block copolymers of propylene oxide and ethylene oxide, ethoxylated alcohols and mixtures thereof.

19. The process of claim 16 wherein said nonionic surfactant is selected from the group consisting of triglycerol monooleate, polyoxyethylene (20) sorbitan monooleate and mixtures thereof.

* * * * *